United States Patent
Vehrs, Jr.

[11] 3,720,950
[45] March 13, 1973

[54] TIME-DOMAIN CORRELATOR FOR SPATIAL FILTERING IN A PULSED ENERGY SYSTEM

[75] Inventor: Charles L. Vehrs, Jr., Anaheim, Calif.

[73] Assignee: North American Rockwell Corporation, El Segundo, Calif.

[22] Filed: Nov. 28, 1967

[21] Appl. No.: 686,113

[52] U.S. Cl.............343/17.2 PC, 343/7.7, 343/5 DP
[51] Int. Cl...............................................G01s 9/233
[58] Field of Search......343/17.2 PC, 17.1, 14, 5 DP, 343/7.7, 17.2

[56] References Cited

UNITED STATES PATENTS 3,680,096   7/1972   Bosc........................................343/7.7
3,680,104   7/1972   Westaway.....................343/17.2 PC

*Primary Examiner*—T. H. Tubbesing
*Attorney*—William R. Lane, L. Lee Humphries and Rolf M. Pitts

[57] ABSTRACT

A pulse compression coded type pulsed energy system having time-domain correlation means permitting narrow-band processing of wide band receiver signals without comprising the data resolution limits thereof. Local oscillator injection means provides a coded periodic sampling signal at a local oscillator input of an intermediate frequency receiver, the sampling periodicity of which sampling signal is substantially less than the system pulse repetition interval and the coding of which sampling signal is a replica of that transmitted by the pulsed energy system. The time-phase of the sampling periodicity of the sampling signal is discretely progressively varied each pulse repetition interval. Data matrix storage means responsive to the variable time-phase sampling signals reconstructs a range trace signal of improved resolution, which may be further processed by radial extent logic to effect spatial filtering within system subpulse intervals.

27 Claims, 17 Drawing Figures

INVENTOR.
CHARLES L. VEHRS JR.
BY
ATTORNEY

INVENTOR.
CHARLES L. VEHRS JR.

BY *Roger Pitts*

ATTORNEY

TIME-DOMAIN CORRELATOR FOR SPATIAL FILTERING IN A PULSED ENERGY SYSTEM

CROSS REFERENCES TO RELATED APPLICATIONS

1. U.S. application, Ser. No. 430,141 filed Feb. 3, 1965, by J. O. Anderson, et al., for Radar System Having Improved Response to Small Targets, now U.S. Pat. No. 3,500,404.
2. U.S. application, Ser. No. 476,630 filed Aug. 2, 1965, by C. R. Barrett, et al., for Multiple Frequency Radar System Having Improved Response to Small Targets.
3. U.S. application, Ser. No. 488,560 filed Sept. 20, 1965, by D. C. Coleman, et al., for Fully Coherent Multiple Frequency Radar System.
4. U.S. application, Ser. No. 593,237 filed Nov. 7, 1966, by G. P. Cooper for A Wideband Pulsed Energy System.
5. U.S. application, Ser. No. 639,238 filed May 7, 1967, by J. A. Moulton for Range-Gated Moving Target Signal Processor.

BACKGROUND OF THE INVENTION

In the tactical use of pulsed energy systems, such as airborne military radars, the targets of principal interest are generally sharply defined objects such as armored tanks, trucks, bridges or buildings which are small relative to surrounding terrain features, and relative to the range resolution and angular resolution of the system. Such small targets are difficult to distinguish amid the clutter return from the terrain (or rain) or from like targets of large radial extent relative to the range resolution of the radar system pulsewidth and lying at a similar range and direction as the small target of tactical interest.

In the case of a small moving target, fast moving radially relative to the clutter-producing background, the spectral content of the small target echo may be distinguished from the spectral content of the small larger clutter return by means of the relative doppler shift between them by prior art AMTI techniques, as is well understood. However, where the velocity of the tactical target relative to the clutter-producing background is very low (as in the case of slow moving military ground vehicles or stationary tactical targets) or the bandwidth of the clutter spectrum is very wide (due to a large antenna beamwidth or large look-angle), the lesser spectral content of the tactical target radar return may lie within the spectrum of the larger clutter return, whereby the doppler filtering of AMTI techniques cannot be effectively employed.

Attempts to enhance the detection of a small target echo contained in clutter return have included time-coherent integration or the additive combining of corresponding range portions of the range trace signals received during a selected member of successive pulse repetition intervals by means of a tapped delay line or scan converter, as described for example in U.S. Pat. No. 3,113,311 issued Dec. 3, 1963, to Searle and Henderson for a Radar Integrating System. However, such technique is of limited effectiveness due to the amount of signal storage capacity required, and the allowable length of the data processing interval limits the obtainable minimum signal-to-clutter ratio. In other words, the minimum clutter content is yet limited by the transmitted pulsewidth employed by the pulsed energy system.

Although the use of a narrow transmitted pulsewidth obviously serves to improve range resolution and signal-to-clutter ratio, such technique imposes range-performance limitations upon a peak-power limited transmitter. Other means sought for improving the range resolution or signal-to-clutter ratio have employed pulse compression techniques in which a transmitted pulse is selectively modulated, and the receiver (filter) responds to compress a received echo of the modulated pulse into a much shorter one. A description of such pulse compression techniques, including frequency-modulation pulse compression and phase-coded pulse compression is included in Section 10.9 of "Introduction to Radar Systems" by Skolnik, published by McGraw-Hill (1962). A basic shortcoming of such technique is the difficulty in reducing the principle to practice, due to the frequency stability requirements and the difficulty of matching the receiver-filter to the transmitter modulation. Also, the theoretical resolution limit or pulse compression effect of such techniques normally requires a higher bandwidth than that conveniently obtainable in the compression filter, intermediate frequency and video stages of the receiver. In other words, receiver bandwidth limitations compromise the theoretical high resolution limits and determine the actual resolution obtained from classical pulse compression techniques.

Discrete multiple frequency techniques (such as those described in copending U.S. application, Ser. No. 430,141 filed Feb. 1965, U.S. application, Ser. No. 476,630 filed Aug. 2, 1965, and U.S. application, Ser. No. 488,560 filed Sept. 20, 1965, all of which applications are owned by North American Rockwell Corporation, assignee of the subject invention) have been utilized to improve signal-to-clutter ratio, but employ an undesirably large transmitted bandwidth. Such disadvantage is sought to be avoided by combining the chirp-transmission of a frequency modulated pulse compression type system with the further coding and receiver processing of the multiple frequency technique, as taught in U.S. application, Ser. No. 593,237, owned by North American Rockwell Corporation. However, all of such multiple frequency and pulse compression techniques yet suffer from signal-to-noise limitations associated with such widebandwidth processes. Also, the display circuits of such systems require high threshold levels in order to avoid responding to random fluctuations in large clutter returns. In other words, in order to discriminate between a source of clutter and a discrete target, the target signal amplitude must be significantly larger than the average amplitude of the clutter return.

In an article, "Pulse Compression Research in the United Kingdom" by E. H. Boyenval and comprising Chapter 4 of the text "Radar Techniques for Detection, Tracking and Navigation," edited by W. T. Blackband and published by Gordon and Breach Science Publishers (1966), there is described a time correlator technique for effecting pulse compression by the use of a single local oscillator waveform input to a tapped delay line, the local oscillator waveform being similarly chirped as a transmitted waveform. Correlation of the discretely delayed local oscillator samples with the received RF echoes produces IF signals, the IF frequency components of each of which correspond to a discrete range or separate range bin. A sampling gate at the output of each IF filter gates out the response of such filter for a sampling interval corresponding to the pulsewidth and occurrence of the associated local oscillator input in response to a gate control or sampling pulse input having a like duration as the delayed local oscillator waveform and a periodic occurrence corresponding to the delay of such local oscillator waveform.

In reconstructing a range trace signal of improved resolution by means of the mechanization disclosed by Boyenval, it is necessary to employ at least one IF filter per tap of the tapped delay line, no provision being made for time sharing of a single filter of a given bandwidth by all sampled intervals. Such large minimum number of IF filters, utilized by such tapped delay line mechanization, is made further necessary in view of the gating interval employed by the IF filter output gating means. Further, although the combined IF output of the gated filters represents a range trace signal of reduced overall clutter content, no processing is taught for distinguishing discrete clutter elements thereof from cultured targets of interest. Moreover, the use of a delay line limits the obtainable resolution (or compromises resolution performance) due to delay line bandwidth limitations.

SUMMARY OF THE INVENTION

By means of the concept of the subject invention, a coded wide bandwidth pulse transmitter cooperates with an inherently gated narrow bandwidth intermediate frequency receiver to provide a sampled range trace signal having an inherent resolution corresponding to the reciprocal of the transmitted bandwidth, and having an improved signal-to-noise ratio.

In a preferred embodiment of the invention, there is provided a time-domain correlator, including local oscillator injection means in cooperation with the intermediate frequency receiver for injecting a coded periodic sampling signal at a local oscillator input of the intermediate frequency receiver, the sampling periodicity of the sampling signal being substantially less than the pulse repetition interval of the pulsed energy system, and the coding of which coded sampling signal is a replica of that transmitted by the pulsed energy system and representing a bandwidth the reciprocal of which is less than the sampling period, whereby a sampled range-trace signal of improved resolution is provided. The time-phase of the sampling periodicity is discretely progressively varied each pulse repetition interval by an amount less than the coding bandwidth. Data matrix storage means responsive to the variable time-phase sampled receiver signals reconstructs a range trace signal having an improved range resolution and reduced clutter content.

By means of the above-described arrangement, normally narrow bandwidth receiver (intermediate frequency and video) circuits may be employed to effect high resolution processing (high signal-to-clutter ratio) while retaining high signal-to-noise ratios. Also, because of the high resolution limits thus obtained, sophisticated logic may be employed to spatially filter such data, including automatic thresholding of each range bin (e.g., range-bin thresholding) and avoiding the false target indications resulting from prior-art average-thresholding over the range-trace. Moreover, such logic may further include means for distinguishing such thresholded targets on the basis of radial extent discrimination and radial velocity discrimination (rate of change or range). Accordingly, an object of the invention is to provide an improved time-domain correlator for a pulsed energy system.

Another object of the invention is to provide a pulsed energy system correlator providing both improved signal-to-clutter ratios and signal-to-noise ratios.

Still another object of the invention is to provide time-domain correlator means allowing narrow bandwidth receiver processing of wide band signals in a pulsed energy system.

A further object is to provide a pulsed energy system having a substantial range resolution improvement over that range resolution represented by the transmitted pulsewidth.

Yet a further object is to provide narrow bandwidth means for cooperation with a wideband pulsed energy system for spatial filtering of range trace signals received by said system.

Still another object of the invention is to provide processing of wideband system pulse compression signals for target qualification as to threshold, amplitude, and radial extent.

These and further objects of the invention will become apparent from the following description, taken together with the accompanying drawings, in which

BRIEF DESCRIPTION OF THE DRAWINGS

In the figures, like reference characters refer to like parts.

DESCRIPTION OF THE PREFERRED EMBODIMENT

Figure 1:
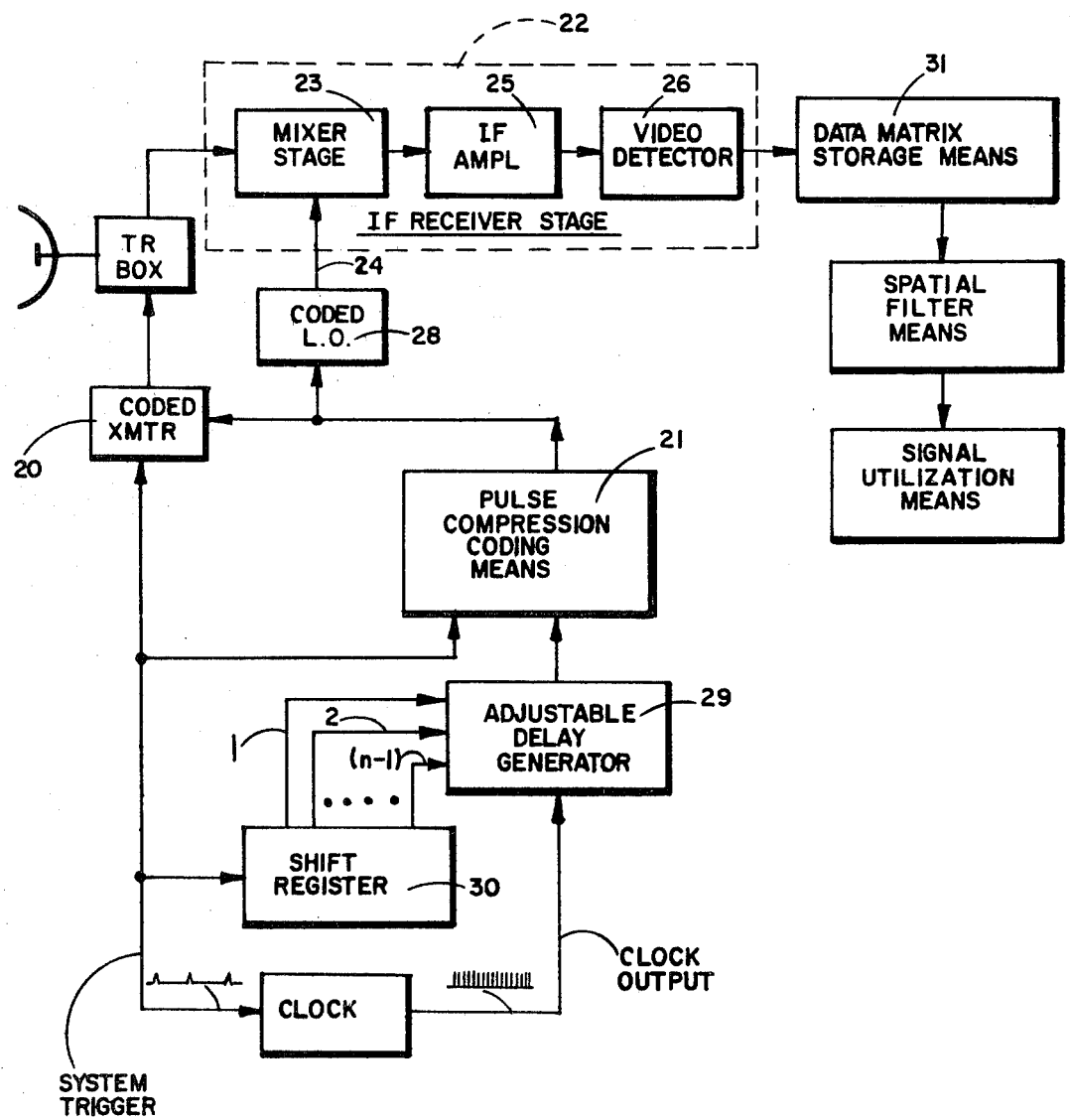
FIG. 1 is a simplified block diagram of a system embodying the concept of the invention.

Referring now to FIG. 1, there is illustrated a simplified block diagram of a system embodying the concept of the invention. There is provided a coded pulsed energy system, comprising a pulsed radar transmitter 20 responsive to periodic coding means 21 for providing a preselectively coded pulsed transmission at a preselected system pulse repetition interval (provided by a system trigger). There is also provided a narrow band intermediate frequency receiver stage 22 comprising a mixer stage 23 having a local oscillator input 24, an intermediate frequency amplifier 25 and a video detector 26, cooperatively arranged in a manner well-understood in the art. Coding means 21 cooperates to provide a series, or pulse train, of coded outputs the periodicity of which correspond substantially to the pulse width of the pulsed energy transmitted by transmitter 20, for reasons which will become more fully apparent hereinafter. However, transmitter 20 is triggered at pulse repetition intervals which are, of course, substantially greater than either the periodicity of coding means 21 or the pulsewidth of the pulsed energy transmitted by transmitter 20.

There is further provided, in FIG. 1, time domain correlation means comprising local oscillator injection means in cooperation with the intermediate frequency receiver 22 for applying a coded periodic sampling signal at the local oscillator input 24 of intermediate frequency receiver 22, the sampling periodicity of which coded sampling signal is substantially less than the pulse repetition interval of the pulsed energy system and the time phase of which sampling periodicity is discretely progressively varied each pulse repetition interval by an amount less than the sampling periodicity. The coding of the coded sampling signal (on line 24) is a replica of that transmitted by coded transmitter 20. Such coded local oscillator injection means in FIG. 1 is comprised of a coded local oscillator 28 responsively coupled to coding means 21 for periodically providing a local oscillator output signal, coded similarly as the coded system transmission. Coding means 21, in turn, is coupled to a periodic impulse source or clock by a voltage-controlled delay generator 29. The time-phase of the periodicity of the coded local oscillator output is discretely adjusted, or progressively varied, each pulse repetition interval relative to the system trigger by control means such as a shift register 30 responsively coupled to the system trigger for applying weighted, or digitally coded, control signals to a control input of delay generator 29.

Figure 2:
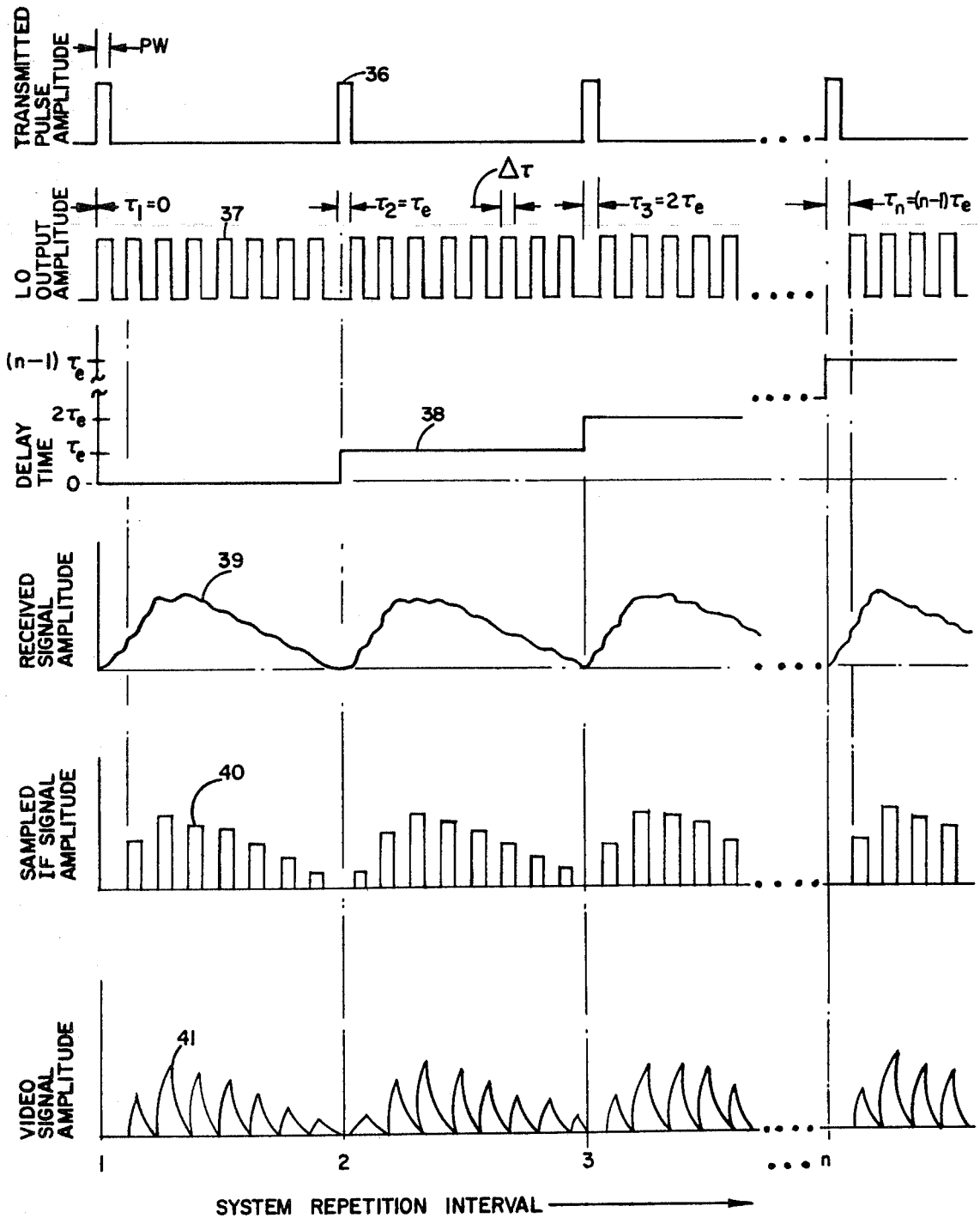
FIG. 2 is a representative family of the histories of the response of the system of FIG. 1.

The cooperation of transmitter 20, receiver 22 and coded local oscillator 28 may be more easily appreciated by reference to FIG. 2.

Referring to FIG. 2, there is provided a family of representative time histories of the response of the system of FIG. 1. Curve 36 represents the amplitude envelope output of transmitter 20 in response to the combined input from the system trigger and coding means 21; curve 37 represents the amplitude envelope output of local oscillator 28 in response to the input from coding means 21, illustrating a periodicity substantially less than the pulse repetition interval of curve 36 and having a time phase relation ($t_n$) thereto which is progressively increased each succeeding system pulse repetition interval. Curve 38 represents the time delay or change in time phase relation of curve 37 to curve 36 imparted by the cooperation of elements 29 and 30 in FIG. 1, and shows the progressive increase in discrete value each pulse repetition interval. Curve 39 represents the amplitude envelope of a range trace echo signal received in response to transmitted energy pulse; while curve 40 represents the sampled intermediate frequency signal output amplitude of mixer 23 in response to the cooperation of mixer 23 and local oscillator 28, and corresponds to the modulation of curve 39 by curve 37. In other words, mixer 23 (in FIG. 1) provides an intermediate signal output in response to the application of a receiver signal only during the injection of a local oscillator signal on input line 24, which reduces the RF receiver signal to an intermediate frequency. Thus, local oscillator 28 (in FIG. 1) cooperates with mixer 23 to gate IF receiver stage 22, whereby a sampled, or "lumpy," IF range trace signal is provided. The duration of each signal sampling interval $\Delta\tau$ corresponds to the transmitted pulsewidth due to the cooperation of the replica coding of local oscillator 28 (e.g., coded similarly as the transmitted pulse) and the narrow bandwidth of IF amplifier 25. However, the target resolution represented by each "lumpy" sample of the sampled range trace signal corresponds to the reciprocal of the transmitted bandwidth.

In other words, only the coded echo from that range corresponding to the range time of an interval sampled by local oscillator 28 will result in an intermediate frequency signal which will, during all of such specific interval, result in an intermediate frequency signal output having a component lying within the bandpass of narrow band IF amplifier 25. Other signal returns from greater or lesser ranges will not so cooperate with such specific local oscillator sampling injection, and the resultant broadband IF components will not appear at the output of filter-amplifier 25. Where the reciprocal of the coded transmitter bandwidth is less than the receiver sampling, or gating, interval employed, then the resolution provided by such sampling interval represents that lesser interval or finer resolution of the transmitted bandwidth; and the output energy of IF amplifier 25 over the larger period of the sampling interval represents the time-integration of the target return for a discrete target at such sampled range (e.g., located within such gated range bin).

Accordingly, it is appreciated that during each system pulse repetition interval narrow band IF receiver stage 22 and coded local oscillator 28 cooperate with coded transmitter 20 to provide a sampled range trace signal having a resolution representing the reciprocal of the broad bandwidth of the transmitted RF signal. By progressively changing the time-phase of the coding of local oscillator 28 relative to the system trigger each pulse repetition interval, enough narrow band IF range samples may ultimately be obtained from which to reconstruct a complete range trace signal. For example, by progressively adjusting the time delay of generator 29 each pulse repetition interval by an amount $t_e$ corresponding to the reciprocal of the transmitted RF bandwidth ($1/BW_{RF}$), a sampling of the successive range bins of a complete range trace may be completed by the single IF amplifier 25 (of FIG. 1) in n pulse repetition intervals:

$$n \geq (BW_{RF})/(BW_{IF})$$

where: $BW_{IF}$ = intermediate frequency bandwidth of each IF filter-amplifier

In other words, signal processing speed is traded-off against, or compromised in favor of, reduced bandwidth in the signal processor and reduced number of IF filters without, however, compromising signal-to-clutter performance and signal-to-noise performance.

Figure 3:
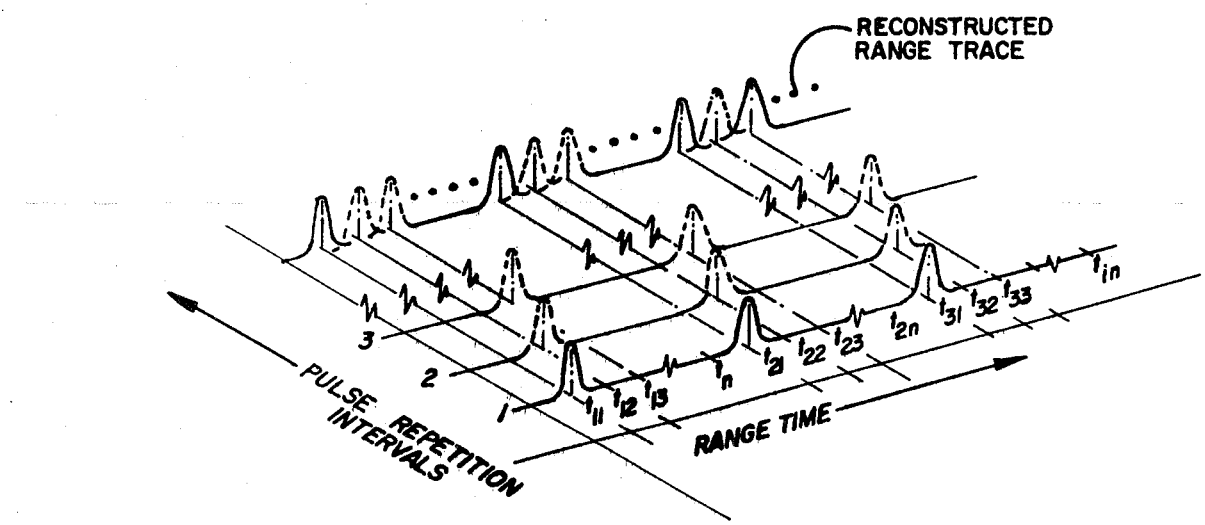
FIG. 3 is an alternate representation of the sampled range trace signals of FIG. 2, illustrating the manner of effecting a reconstructed range trace signal of improved resolution by means of the data matrix storage means of FIG. 1.

Such series of variable time-phase sampled signals may be video detected by detector 26 (in FIG. 1), to provide video signals (curve 41 in FIG. 2) suitable for storage in data matrix storage means 31 (in FIG. 1) for reconstructing a range trace signal having an improved range resolution, as shown more particularly in FIG. 3.

Figure 4:
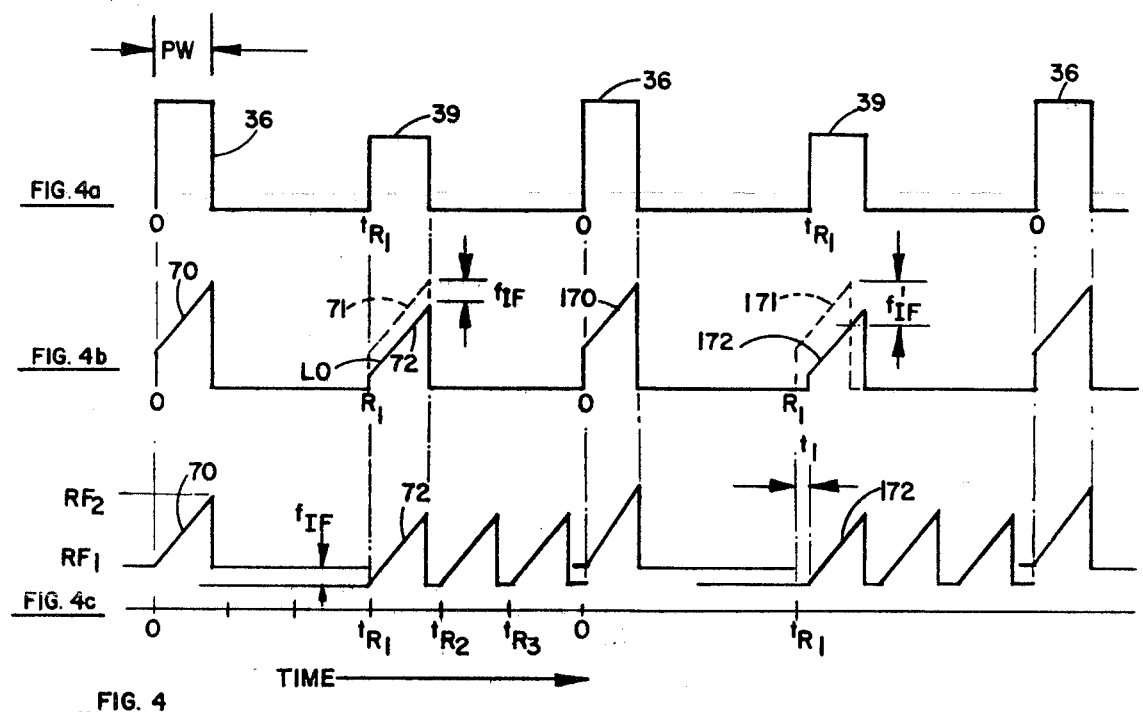
FIG. 4 is a family of representative time histories of the correlator concept of FIG. 1, for a frequency-modulation coding.
Figure 5:
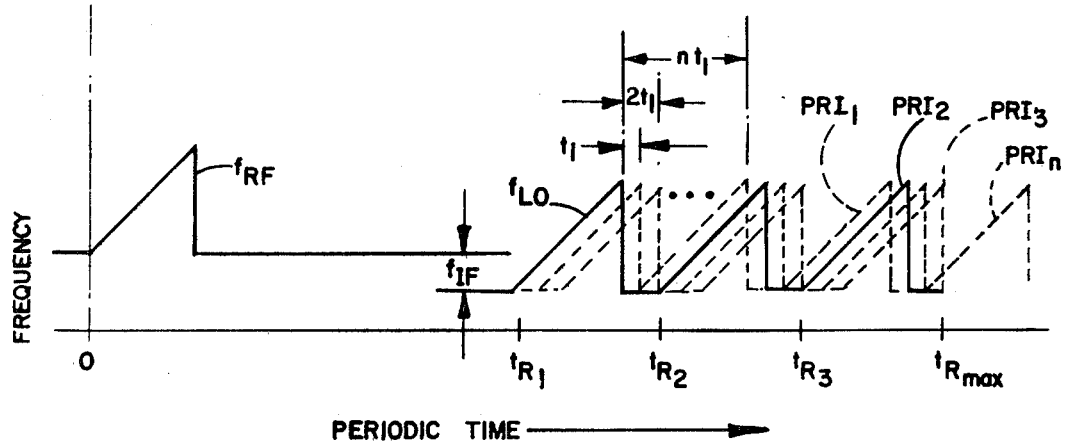
FIG. 5 is a composite periodic time history of the response of the device of FIG. 1 for a frequency modulation coding.

In a specific arrangement, the coding provided by coding means 21 (of FIG. 1) may be of the "chirp" or frequency-modulation type, as shown more particularly in FIGS. 4 and 5.

Referring to FIG. 4, there is illustrated a family of time histories of the response of that arrangement of FIG. 1 for which frequency modulation may be employed as the coding technique. Such time histories, shown in an exaggerated and compressed time scale for convenience in exposition, include curves 36 and 39 representing the respective amplitudes of a transmitted pulsewidth and a received echo from a discrete target (at range $R_1$) while curves 70, 71 and 72 represent the respective frequency variation with time of the chirped transmitted pulsewidth, the received echo from a discrete target (at range $R_1$) and a local oscillator injection pulse (injected at range time $t_{R_1}$, corresponding to the occurrence of that target signal represented by curves 37 and 71).

It is to be seen from a comparison of curves 71 and 72 in FIG. 4 that where a preselected difference frequency ($f_{IF}$) is maintained between the transmitted frequency waveform (as reflected by the received echo signal 71) and the local oscillator injection (curve 72), such preselected frequency may be observed between the received echo and the local oscillator during the interval of the local oscillator injection, when such injection occurs in time phase with the received echo. In such case, such difference frequency is manifested at the output of mixer 23 (in FIG. 1) as an input within the bandpass of IF amplifier 25, and is fed to detector 26 for envelope detection thereof. Where, however, in a subsequent, system pulse repetition interval the time-phase of the local oscillator injection is discretely varied (relative to range time $t_{R_i}$), as shown by the relation of curve 172 to curve 171 in FIG. 4, then a larger difference frequency, $f'_{IF}$, occurs at the output of mixer stage 23 (of FIG. 1), which larger IF frequency is outside the pass band of IF amplifier 25. Hence, a given time phase-adjusted local oscillator injection results in sampling a given subpulse interval of a range-trace during that system pulse repetition interval associated with such time-phase adjustment. In other words, the frequency-scanned local oscillator is operated repetitively within each system pulse repetition interval for sampling portions of a range trace signal, the time-phase of the frequency-scanned local oscillator pulse train being discretely, progressively adjusted each successive system pulse repetition interval, as shown in FIG. 4c. The effect of such progressive adjustment of the local oscillator injection, in providing a sampled range trace, is shown for the periodic time interval of a range trace in FIG. 5 for n pulse repetition intervals ($PRI_1 - PRI_n$).

Although the processing time to reconstruct a range trace signal of improved resolution for the single IF filter-amplifier 25 of FIG. 1 has been indicated as $n/PRF$, where n is equal to the ratio of the RF bandwidth to the IF amplifier bandwidth, such processing interval may be reduced by the use of parallel channels or IF filters, each successive one having a center frequency greater than the preceding one by an amount equal to at least the IF bandwidth and the incremental delay employed by delay generator 29 correspondingly increased (and the number of delay increments reduced).

Figure 7:
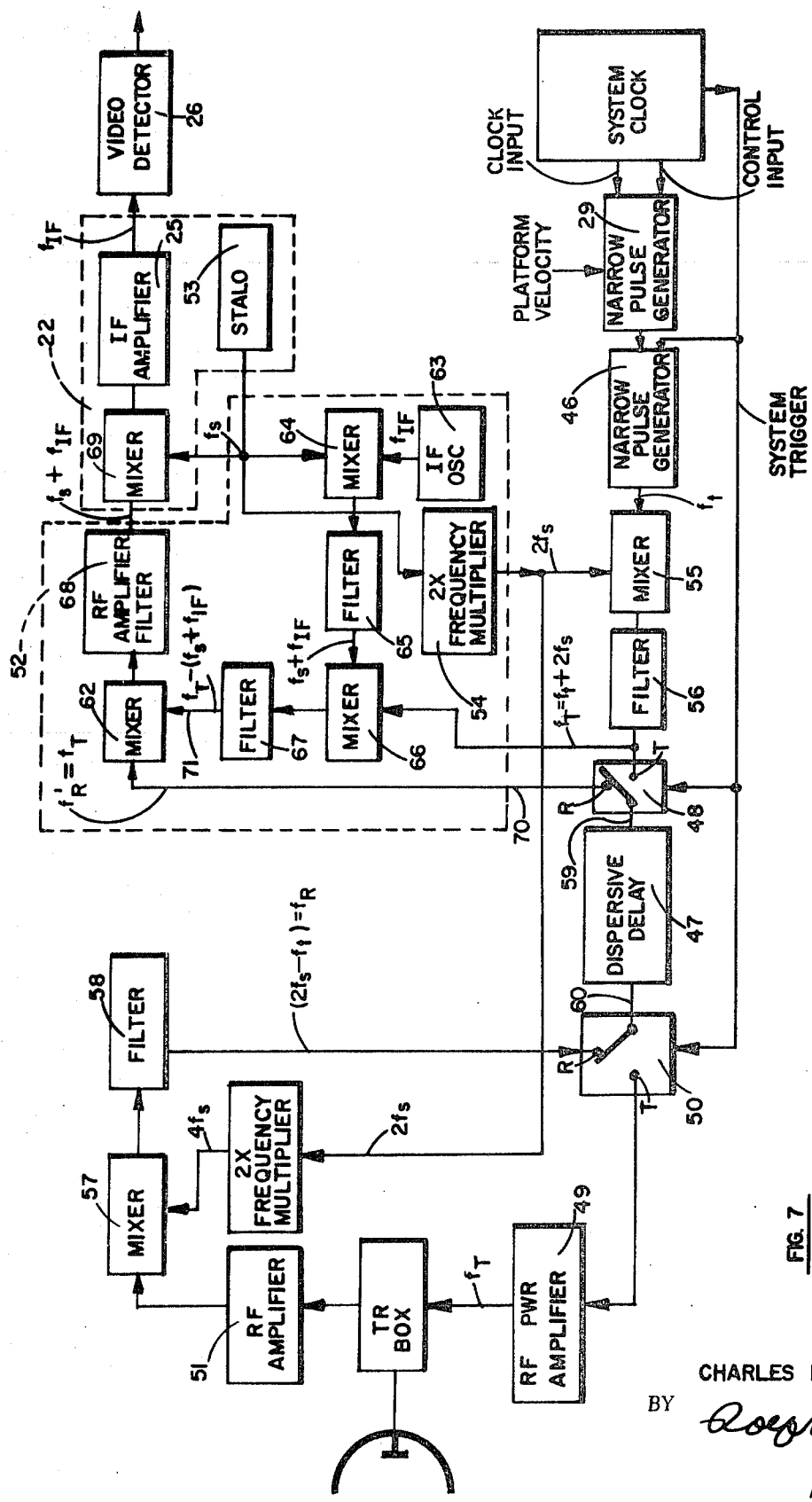
FIG. 7 is a block diagram of a frequency modulated pulse compression system embodying another aspect of the invention.

Referring to FIG. 7 there is illustrated in block diagram a preferred embodiment of one aspect of the invention, employing frequency modulation coding. There is provided pulse compression coding means comprising a narrow pulse generator 46 drivingly coupled to dispersive delay means 47 by a first RF switch 48 during a "transmit" mode, to produce a frequency-modulated RF pulse, substantially in accordance with the teaching of the above-noted U. S. application Ser. No. 593,237 filed by G. P. Cooper. Such frequency-modulated RF pulse output of delay element 47 is coupled to an RF power amplifier 49 by a second RF switch 50 during the "transmit" mode.

In the "receive" mode of switches 48 and 50, receiver signals from the output of a receiver RF amplifier 51 are fed through dispersive delay line 47 to an input of an image frequency rejection type mixer 52 for conversion to an intermediate frequency, which intermediate frequency is filtered by an IF amplifier 25 prior to envelope detection by video detector 26. Pulse compression is effected by the cooperation of the switched dispersive delay element 47 in such arrangement with STALO frequency coding means.

Such STALO means comprises a stable local oscillator (STALO) 53, the output of which is frequency-doubled by a first frequency multiplier 54, mixed with the output of pulse generator 46 by a mixer 55, and then bandpass limited by a filter 56 for providing a spectral output $f_T$ corresponding to the sum or upper sideband of the pulse generator output spectrum and the doubled STALO frequency, which spectral output is chirped by delay element 47 for pulsed transmission.

Receiver RF signals, including received echoes of the chirped, pulsed transmission, are mixed at a first receiver-mixer 57 with a second STALO signal having a frequency ($4f_s$) double that of the STALO input to mixer 55. In this way, an upper and lower sideband signal are created:

$$4f_s \mp (f_t + 2f_s) = (2f_s - f_t) + (6f_s + f_t) \quad (1)$$

The first term in the right-hand member of Equation (1) represents the lower sideband component of the output of receiver-mixer 57 and corresponds to the conjugate sideband of that transmit-mode output of delay element 47 transmitted in response to the gated input thereto applied from filter 56. In other words, by bandpass filtering only such lower sideband component by a bandpass filter 58, a frequency-modulated receiver RF signal is provided which is oppositely modulated relative to the frequency-modulated transmitted RF signal. Accordingly, the application of such lower sideband receiver signal at terminal 60 of dispersive delay 47 by switch 50 (during the "receiver" mode or portion of a pulse repetition interval) will produce an oppositely dispersive effect from that provided by applying the upper sideband output of filter 56 at terminal 59 (during the transmit mode). Hence, pulse compression ($f_R'$) of the spectrum $f_R$ will result in the application of the lower sideband output of filter 58 to terminal 60 of delay element 47, the compressed pulse output appearing on terminal 59 of delay element 47. In other words, $f_R' = f_T$.

Because the same delay line element is used for compression as is used for transmitter chirp coding, no problems arise in the matching of the pulse compression function to the chirp function as in prior art pulse compression systems, and the actual pulse compression effect obtained by the arrangement of FIG. 4 more nearly approaches the theoretical limit defined by the reciprocal of the transmitted RF bandwidth.

The pulse-compressed RF receiver output on terminal 59 (of dispersive line 47) is fed by switch 48 to image frequency rejection mixer 52 which cooperates with the injected periodic output of filter 56 to reduce such compressed RF pulse to an intermediate frequency. Such reduction or frequency translation is accomplished by two successive mixing stages. The first mixer stage comprises a mixer 62 coupled to the "receive" or R terminal of RF switch 48 and having a reference input coupled to a periodic source of the frequency $[f_T - (f_s + f_{IF})]$. Such source, in turn, includes a mixer 64 input-coupled to STALO 53 and an intermediate frequency ($f_{IF}$) oscillator 63 and output-coupled to a bandpass filter 65, responsive to the upper side band ($f_s + f_{IF}$) of the output of mixer 64. Such output is combined with the periodically pulsed output ($f_T$) of filter 56 by a mixer 66, the output of which is bandpass-limited by a filter 67 to the lower sideband thereof $[f_T - (f_s + f_{IF})]$. This latter signal is employed as a local oscillator input to mixer 62, which provides an upper and lower sideband output:

$$f_T \mp [f_T - (f_s + f_{IF})] = (f_s + f_{IF}) + [2f_T - (f_s + f_{IF})] \quad (2)$$

The first expression ($f_s - f_{IF}$) of the right hand member of Equation (2), corresponding to the lower sideband of the output of mixture 62, is bandpass filtered by an RF filter 68 at the output of mixer 62 and applied to another mixer 69. Mixer 69 employs the output ($f_s$) of STALO 53 as a local oscillator input to reduce the output of filter 68 to a lower sideband component which is bandpass filtered by IF amplifier 25:

$$f_s - (f_s + f_{IF}) = f_{IF} \quad (3)$$

Such IF signal, occurring within the bandpass of IF amplifier 25, occurs in the time domain only for a pulse compression receiver input to mixer 62 (of mixer means 52) which is coincident with the occurrence of the injection of the coded pulse output of filter 56 into mixer 66 (of mixer means 52). By operating narrow pulse generator 46 repetitively within a transmitter pulse repetition interval in response to a system clock input, a sampled range trace interval is provided by the output of IF amplifier 25. By adjusting the time phase of the clock input to pulse generator 46 each transmitter pulse repetition interval, by means of adjustable delay generator 29, an entire range trace signal may be reconstructed by suitable data matrix storage means, as indicated in connection with the description of FIGS. 1 and 3. In other words, pulse generator 46 is pulsed at the beginning or "transmit" mode of a transmitter pulse repetition interval, in response to the system trigger, in synchronism with the operation of RF switches 48 and 50 in the "transmit" mode; and is then repetitively pulsed during the remainder or "receive" portion of the system trigger pulse repetition interval in response to a selectively delayed clock input, the delay being progressively varied by a discrete amount each system trigger pulse repetition interval.

Alternatively, a commercially available single-sideband mixer channel could be employed rather than the image rejection mixer stage 52 of FIG. 7. However, such single sideband devices suffer from the disadvantage of providing only limited sideband rejection due to phase alignment problems.

Accordingly, it is to be appreciated that the arrangement of FIG. 7 represents a frequency modulated pulse compression system including an intermediate frequency receiver stage 22 having a receiver-mixer 69, STALO 53 and IF amplifier 25, and further including a source 56 of a spectrum to be transmitted ($f_T$). Elements 64, 65, 66 and 67 comprise filtered mixing means responsive to sources of frequency $f_T$, $f_s$ and $f_{IF}$ for providing a local oscillator injection signal spectrum ($f_T - (f_s + f_{IF})$). Elements 62 and 68 comprise first receiver mixing means responsive to a pulse compressed receiver output (on line 70) and having a local oscillator input 71 responsive to the local oscillator injection signal ($f_T - (f_s + f_{IF})$) for providing a lower sideband frequency translated output ($f_s + f_{IF}$) to an input of the receiver-mixer 69 of the intermediate frequency receiver stage 22. Elements 47, 48 and 50 comprise switchable dispersive delay means having transmit and receive modes, such delay means input-coupling source 56 of coding spectrum $f_T$ to a transmitter 49 during the transmit switching mode to provide frequency modulation of a pulsed transmission. Elements 57 and 58 comprise radio frequency conditioning means in cooperation with STALO 53 for converting received echoes of the transmitted radio frequency spectrum to a lower sideband ($2f_s - f_t$) of the combination of the coding spectrum ($f_t$) and twice the frequency of STALO 53. Switchable delay means 47, 48 and 50, during the receive switching mode thereof, are interposed in circuit between an output of radio frequency conditioning means 57, 58 and an input of first receiver mixing means 62 for providing (on line 70) a pulse compressed RF receiver input of mixer 62 of IF stage 52.

Figure 6:
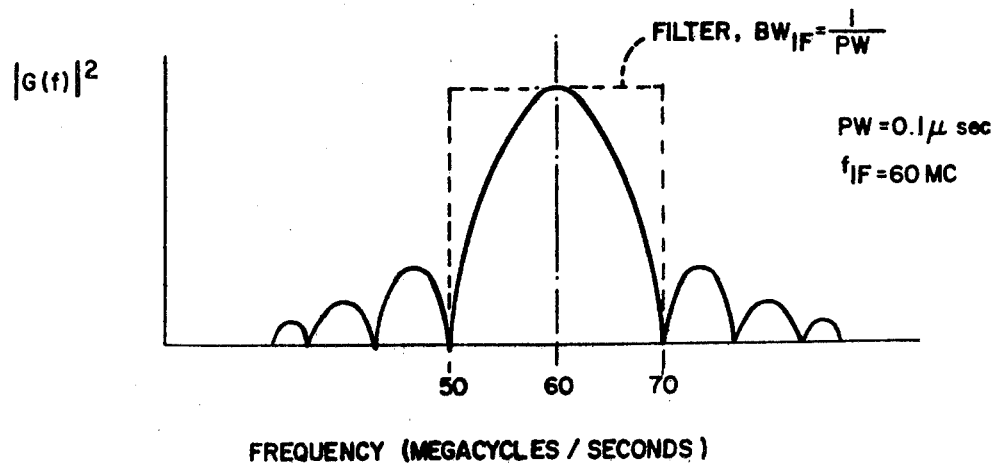
FIG. 6 is a spectral diagram of the input to the IF amplifier of FIG. 1 relative to the bandwidth of such amplifier, showing the effects of matching the bandwidth to the injected pulsewidth.

Hence, it is to be appreciated that a pulse compressed IF input is provided to the video detectors 26 of FIGS. 1 and 7 by means of narrow bandpass IF filter means 25. For example, for a transmitted pulsewidth of 0.10 microsecond (corresponding to the reciprocal of an IF bandwidth ($BW_{IF}$) of 20 mc for IF receiver amplifier 25 (see FIG. 6), and having a frequency-modulation bandwidth ($BW_{RF}$) of 1,000 mc, the pulse-compression effect obtained corresponds to the reciprocal of the RF bandwidth and represents a range resolution of less than 1 foot.

In other words, by matching the system pulsewidth and IF bandwidth, the system range resolution varies inversely with the RF bandwidth and is substantially unaffected by the actual system pulsewidth employed.

Such high resolution data, obtained by means of ordinary low-bandwidth IF receiver processing, may require further processing in order to obtain useful information or, more particularly, to distinguish and extract the additional information obtainable from such high resolution data. Such additional processing may include processing by data matrix means for reconstructing a range trace signal of improved resolution, as shown in FIG. 8.

Figure 8:
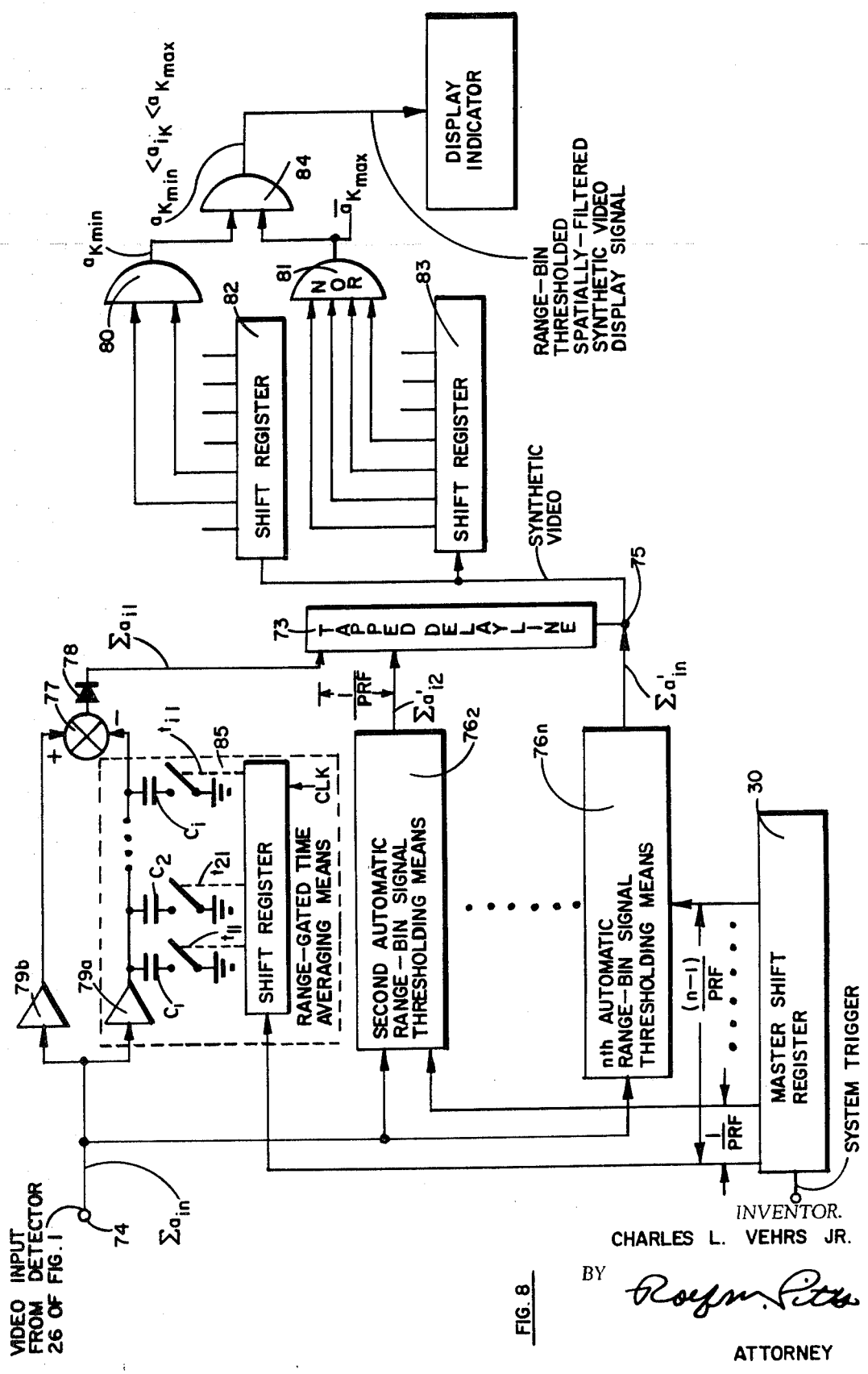
FIG. 8 is a schematic arrangement of range-bin thresholding data matrix means in cooperation with a radial extent spatial filter.

Referring to FIG. 8, there is illustrated signal processing means for reconstructing a range trace signal from the sampled data provided by the correlator arrangements of FIGS. 1 and 7. Such means include a tapped delay line 73 having a plurality of taps responsively connected to an input terminal 74 which is coupled to the output of video detector 26 (of either FIG. 1 or FIG. 7). The interval between adjacent ones of successive taps corresponds to the system pulse repetition interval (e.g., reciprocal of the pulse repetition frequency, PRF), the number of successive taps corresponding to the number ($n$) of pulse repetition intervals required to effect range trace sampling. By means of such arrangement, the sampled data of such ($n$) pulse repetition intervals for a discrete progressive time phase interval associated with each successive pulse repetition interval, are combined at terminal 75 to provide a composite or reconstructed range trace signal of improved resolution, corresponding to that illustrated in FIG. 3.

Although the clutter content tends to be reduced by the above-described pulse compression and time-domain correlation techniques, yet it may be desired to threshold the receiver signals in order to more readily discern a discrete target amid a clutter background. For this reason, it may be desirable to include means for separately establishing the threshold within each sampled range bin, as a function of the signal conditions therein. Such automatic range-bin signal thresholding means is shown in FIG. 8 as comprising a plurality ($n$) of thresholding means 76, each interposed between a respective tap of tapped delay line 73 and input terminal 74 for separately thresholding each of the range bins of a range-bin set sampled in a corresponding pulse repetition interval. Such threshold (for a given range bin) is developed as a function of the time-averaged amplitude of the signal return for a given range-bin.

For example, for a first sampled range bin set $R_{11}, R_{21}$ . . . $R_{t1}$, signal averages are obtained and stored by a plurality of mutually parallel switched integrating means $C_1, C_2$ . . . $C_t$, each of which is switched across the unipolar video input provided by terminal 74 during a respective sampling interval associated with range time $t_{11}, t_{21}$. . . $t_{t1}$. Each of such range-gated time-averaged signals are compared with the corresponding range-bin or portion of a current range-trace signal by comparator means, which may comprise a differential amplifier 77 and blocking diode 78, for providing an output only for that much of a range-bin signal amplitude in excess of the time-averaged amplitude associated with such range bin. Where desired, impedance isolation amplifiers 79a and 79b may be interposed between terminal 74 and the two inputs of an automatic range bin signal thresholding network. The switching of the switched capacitors $C_1, C_2$ . . . $C_n$ may be effected by field-effect transistors or the like responsively coupled to the system trigger or a system clock by delay means such as a shift register or tapped delay line, the time interval between adjacent ones of successive switches corresponding to the time-domain correlator sampling interval employed within the sampled pulse repetition interval.

For a second or subsequent sampled pulse repetition interval, 2/(PRF) . . . $n$/(PRF), the sequential switching of the range-gated time-averaging means 85, or switched capacitors, of a second signal thresholding means $76_2$ is delayed by the associated time-phase amount of the correlator local oscillator injection delay and accomplished during that system pulse repetition interval associated with such local oscillator injection delay. Such system pulse repetition interval synchronization of each range-gated time averaging means may be achieved by employing the same shift register 30 as is employed by the adjustable delay generator 29 (of FIG. 1) or by a suitable output from the system clock of FIG. 7, or like counting means well understood in the art.

If, desired, the effective threshold provided by the range-bin signal thresholding means of FIG. 8 may be adjusted by adjusting the relative gain of the range-gated time-averaged signal input to the comparator amplifier 77 (relative to the second input thereto) by means of a potentiometer or the like (not shown).

The thresholded range trace signal output on terminal 75 of signal combining means 73 may be further processed to distinguish thresholded fluctuations in clutter (having a large radial extent) from a discrete target of interest. Such processing is provided in FIG. 8 by limit spatial filtering means for indicating the detection of a target having a radial extent within preselected minimum and maximum radial extent limits. Such filtering means comprises first and second coincident logic signalling means 80 and 81, and a first and second tapped delay line means 82 and 83, (shown as shift registers), each having an input coupled to terminal 75 as an input terminal, and further having a plurality of successive taps, the interval between adjacent taps corresponding to a sampled range-bin. The plurality of taps of first delay line 81 corresponds to a preselected minimum radial extent, and is input coupled to logic gate 80; the taps of second delay line 83, which includes a like plurality as element 82 and corresponding to a preselected maximum radial extent, are input-coupled to gate 81. Although such tapped delay line means has been shown as comprising shift registers, scan converters or core memory means could be employed, alternatively.

There is also provided a third coincident logic gate 84 responsive to a coincident input state of gate 80 and a non-coincident state of gate 81 for providing an output signal. The simultaneous occurrence of a signal from each of the inputs to gate 80 indicates a thresholded signal corresponding to a target having a radial extent corresponding to at least the minimum number of contiguous range bins represented by such plurality of inputs. The absence of a simultaneous occurrence of a signal from all of the inputs to gate 81 indicates the absence of a target having a radial extent corresponding to at least the number of contiguous range bins represented by such plurality of inputs. Accordingly, an output signal from gate 84 in response to the coincident input state of gate 80 and non-coincident input state of gate 81 is indicative of a thresholded target having a radial extent within the preselected upper and lower radial extent limits.

Although the spatial filter arrangement of FIG. 8 has been described in terms of two delay line elements 82 and 83, it is clear that only one element 83 need be employed, with the plurality of taps thereof employed by gate 81 including those taps employed by gate 80.

Although range-bin thresholding and two-limit radial extent discrimination may be employed to distinguish a discrete target from a clutter background in the utilization of pulse-compression system data, further discrimination may be desired, where the amplitude of the clutter background varies considerably, relative to both the time-averaged threshold and the component energy of the discrete target return, such as in the case of a clutter source formed by the ocean's surface. In such event, it may be desired to include upper limit amplitude discrimination with the thresholding function, to avoid a false "target alarm" due, for example, to a momentary high clutter return as shown in FIG. 9.

Figure 9:
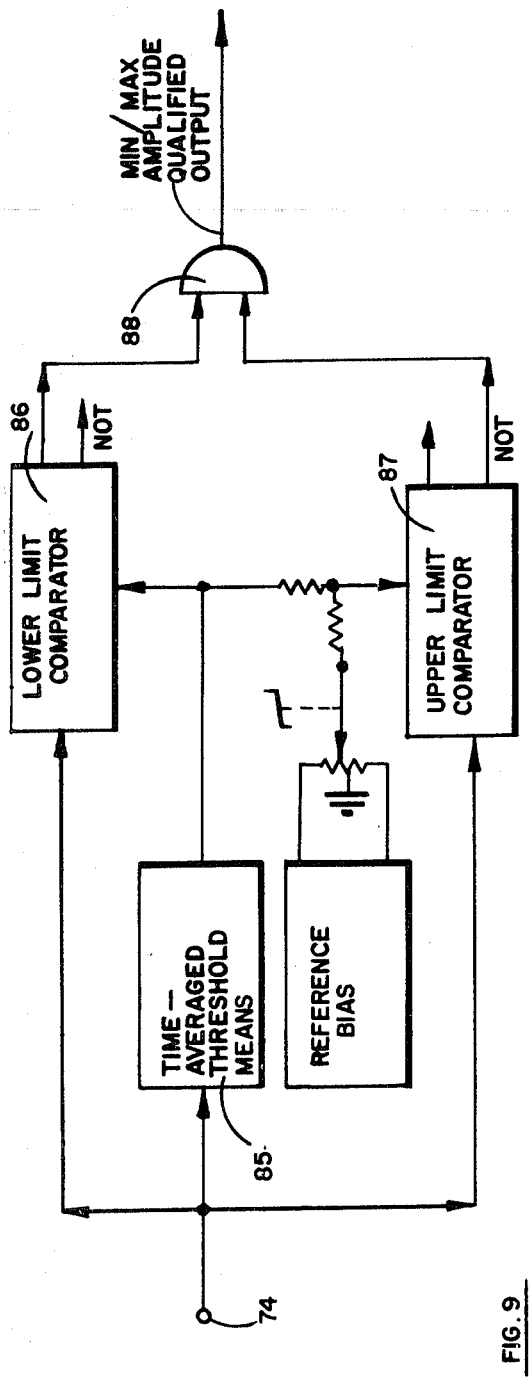
FIG. 9 is a block diagram of a two-limit amplitude comparator, employing the thresholding means of FIG. 7.

Referring to FIG. 9, there is illustrated a two-limit range-gated amplitude discriminator employing the range-gated time-averaging means 85 of FIG. 8 and a lower limit comparator 86, corresponding to elements 77 and 78 of FIG. 8. There is also provided an upper limit comparator 87 having the reference input from time-averaging means 85 selectively biased to provide an upper limit, and arranged to provide an output when the amplitude of the range trace signal on terminal 74 does not exceed such upper limit. A signal gate 88 responsive to comparators 86 and 87 provides an output signal during the interval that the input on terminal 74 exceeds the lower limit input to comparator, while not exceeding the upper limit input to comparator 87.

Such a two-limit amplitude comparator may be employed in the arrangement of FIG. 8, alternative to each of the automatic range-bin signal thresholding means 76, whereby a qualified target signal is provided, being qualified as to two-limit amplitude discrimination and two-limit extent discrimination.

Often it may be desired to effect range-rate (radial rate) discrimination among the plurality of qualified target return signals obtainable from a pulse compression system. The use of doppler filtering techniques in prior art pulsed energy AMTI systems relies on the use of a system range resolution large enough, relative to the target size and speed, to allow observation of the target within such range bin over many pulse repetition intervals, whereby the doppler shift phenomenon may be discerned. Although doppler filtering has been employed for AMTI purposes in prior-art systems, such technique may be of limited effectiveness in a pulse compression system, in view of the high range resolution or small range-bin samples represented by the data elements utilized. In other words, a moving target will normally not remain in a given one of the small range bins (of a pulsed compression system) long enough to allow the observation of the doppler phenomenon. Also, because of the reduced clutter content provided by such pulse compression system, improved subclutter visibility is provided and which is less dependent upon system sighting angle. Accordingly, an alternate technique is employed.

One such alternate technique involves the use of a multiple-target tracker for determining the position difference between two proximate targets detected during successive range trace intervals. In view of the amplitude and extent qualification employed in qualifying that target data which is subjected to range-rate discrimination, the probable targets under surveillance need not represent an unduly large number. Therefore, the position difference between two successively observed target alarms may be indicative of the motion of a moving target of interest. Further, the change in target position occurring between successive observations or system pulse repetition intervals is, of course, indicative of the speed of such moving target. Thus, by employing a nominal radial rate limit as a reference, a moving target such as a submarine periscope may be distinguished from a bobbing oil can. Further, by employing a maximum rate limit, such target may be distinguished from other targets or phenomenon not of interest.

Figure 10:
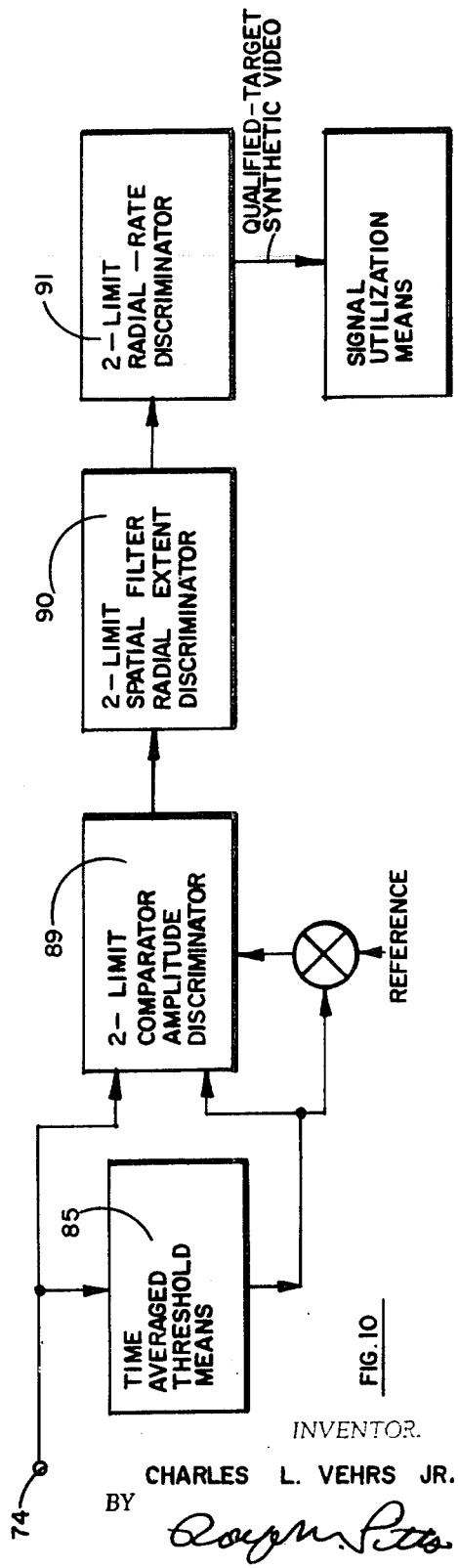
FIG. 10 is a block diagram of a processor for a pulse compression receiver for qualifying a target as to amplitude, radial extent and radial rate.

A block diagram of the general arrangement of such target qualification is shown in FIG. 10, in which there is provided a two-limit amplitude comparator 89, corresponding to elements 86, 87, and 88 of FIG. 9 and in cooperation with time-averaged thresholding means 85 and terminal 74, the output of comparator 89 being fed to a radial extent discriminator 90, corresponding to the arrangement of elements 80, 81, 82, 83 and 84 in FIG. 8. The amplitude and extent-qualified output of discriminator 90 is then fed to a two-limit radial rate discriminator 91. Such latter element may comprise a digitizer, digital memory bank and multiple target tracker for performing range-rate discrimination of the amplitude and extend-qualified target signal inputs thereto.

Figure 12:
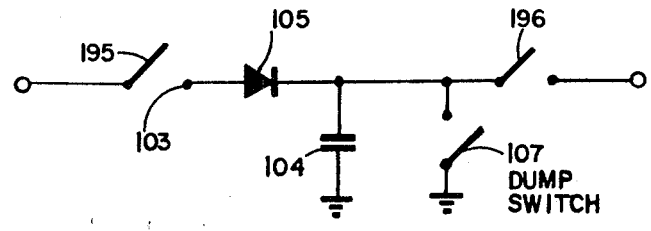
FIG. 12 is a schematic arrangement of a peak-detecting signal storage element of the data cell storage matrix of FIG. 11.
Figure 13:
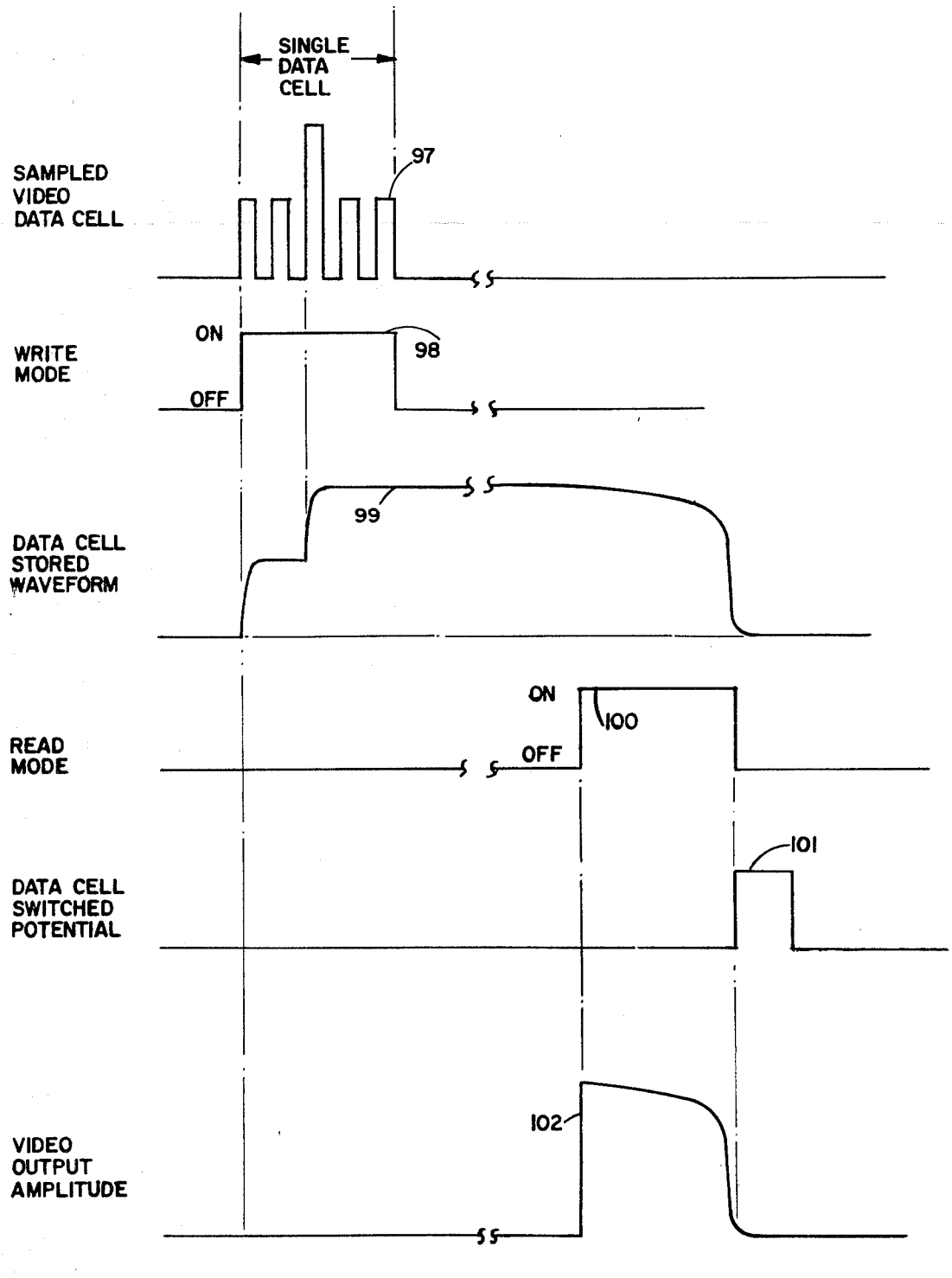
FIG. 13 is a family of time histories illustrating an exemplary mode of response of the device of FIG. 12.

Other forms of processing of high resolution data may be employed. For example, where a discrete cultured target of interest displays a greater degree of reflectivity than the minimum clutter content of such high resolution data, it may be desired to distinguish a peak target return from the background clutter for display by ordinary low-bandwidth, limited resolution type display indicators. Such an alternate form of processing is shown in FIGS. 11, 12 and 13.

Figure 11:
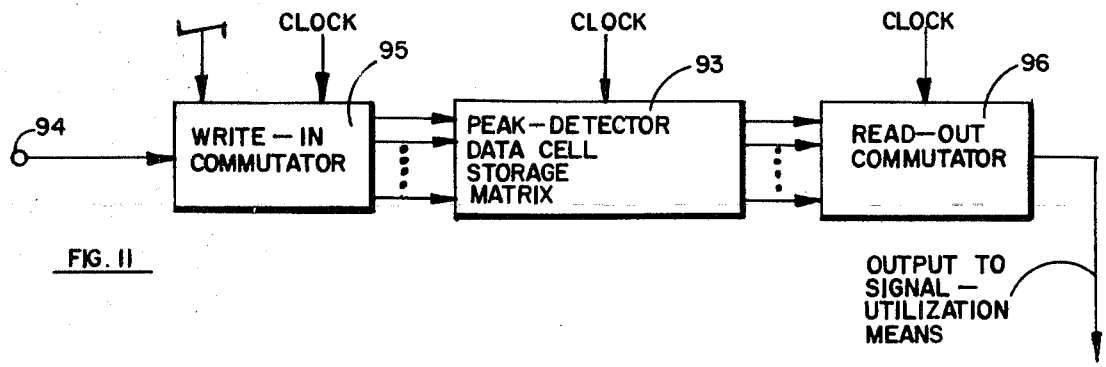
FIG. 11 is a block diagram of a peak detecting data cell storage matrix for processing high-resolution range video signals.

Referring to FIG. 11, there is illustrated means for processing a preselected or limited number of data cells comprising a range trace interval, each cell comprising a like selected number of successive range bins of a sampled range trace interval. There is provided in FIG. 11 a preselected number of peak detecting signal storage elements comprising a peak detecting data cell storage matrix 93, selectively input coupled to a thresholded source of a high resolution video range trace signal (on terminal 94) by a write-in commutator means 95, and output-coupled to signal-utilization means (not shown) by a read-out commutator 96. Write-in commutator 95 is cyclically operated during a "write mode" to switch the video input (on terminal 94), switching a selected portion of a video range trace interval to a corresponding one of the signal storage elements comprising matrix 93; while read-out commutator 96 is operated during a "read" mode to output-couple, in succession, each of the signal storage elements of matrix 93 during a corresponding interval of the "read" mode.

During the "write" mode of each storage element of matrix 93, a selected range trace portion or plurality of successive range trace samples, as a single data cell (curve 97 in FIG. 13), is fed to an input terminal 103 (in FIG. 12) of such single storage element by a switching element 195 (of commutator 95). (See "on" stage of curve 98 in FIG. 13.) Such video input is unipolarly conducted to a storage capacitor 104 by a diode 105. The resultant charging of capacitor 104 back-biases diode 105, as to allow only subsequent charging inputs due to an applied potential larger than such bias, as shown by curve 99 in FIG. 13. In other words, elements 104 and 105 in FIG. 12 cooperate as a peak detector. During that portion of the "read" mode associated with such single data cell storage element, a switch element 196 (of read-out commutator 96) is switched ("on" state of curve 100 in FIG. 13) to output-couple the peak-detected charge which is stored on capacitor 104. The discharge path may include an R-C network interposed in series circuit between capacitor 104 and switch 196, in order to provide a discharge wave shape (e.g., long time constant) representing a limited bandwidth (curve 102 in FIG. 13) capable of being utilized by a display indicator. Dump means 107 is further included in the peak-detector arrangement of FIG. 12 for "dumping" storage capacitor 104 at the end of a data processing interval (curve 101 in FIG. 13).

In normal operation of the arrangement of FIG. 11, the sample period (curve 98 in FIG. 13) employed for each data cell is equal to the total range trace interval which is sampled, divided by the number of data cells comprising the data matrix. By reducing the size of the sampled range interval, or portion, of the range trace signal, the size of the data cell (e.g., the number of range bins within each cell) is reduced. Hence, by observing which portion of a sampled range trace signal provides a thresholded, peak-detected high-resolution target return of interest, an operator may adjust and successively reduce the sample interval of the adjustable write-in commutator to selectively explore such portion of a range trace signal. Each data cell then represents fewer sampled range bins. By successively reducing the size of the sampled portion of the thresholded range trace signal for which a peak-detected data cell matrix is provided, the number of sampled range bins in each data cell is reduced. By such a "zoom lens" approach, the range occurrence and number of a plurality of discrete targets of interest may be determined and adquately displayed, despite the resolution limits of the display indicator and without employing a prohibitively large data storage matrix.

Figure 14:
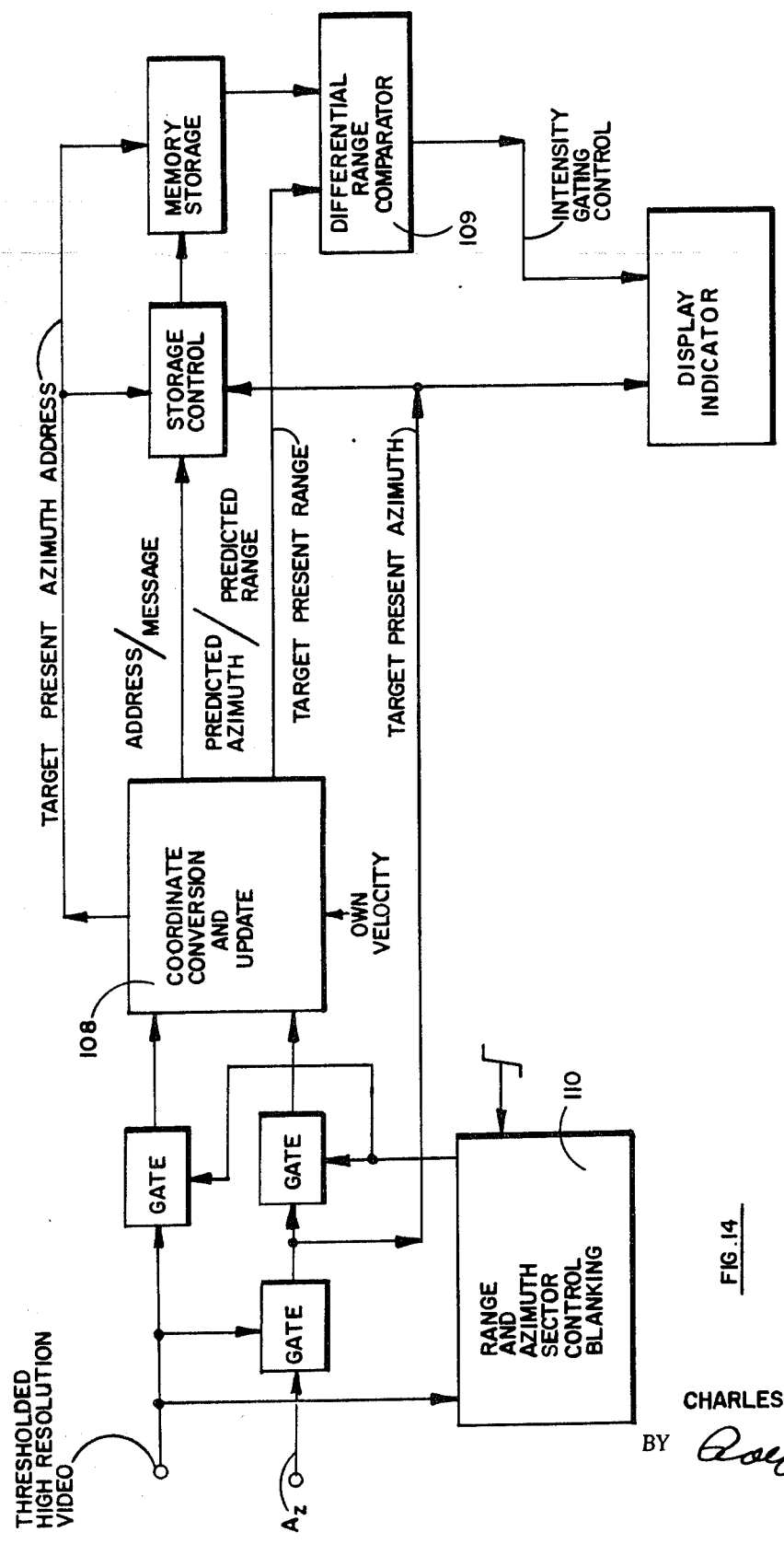
FIG. 14 is a block diagram of a schematic arrangement for further qualifying a high resolution moving target signal as to target velocity.

An arrangement for distinguishing a moving target having a velocity within preselected limits is schematically illustrated in FIG. 14. The thresholded high-resolution video and associated azimuth data (of an azimuthally scanning system) are fed to an updating digital coordinate converter 108, responsive to the platform velocity for computing a target predicted azimuth and predicted range, predicted for a subsequent or future time interval, as well as converting the video signal to a present range signal of like format as the prediction data. Such format may include an address and message, in which the address is the predicted azimuth and the message is the predicted range. By comparing the present position of a detected target signal with a stored predicted position, position difference data may be generated which, when subjected to a two-limit differential range comparator 109, may be utilized to generate a synthetic video signal indicative of the range and direction of a moving target having a two-limit qualified velocity, the differential range limits selected for the prediction interval employed corresponding to preselected velocity limits. Range and azimuth sector blanking means 110 may be incorporated for limiting the data to be so velocity-qualified.

Figure 15:
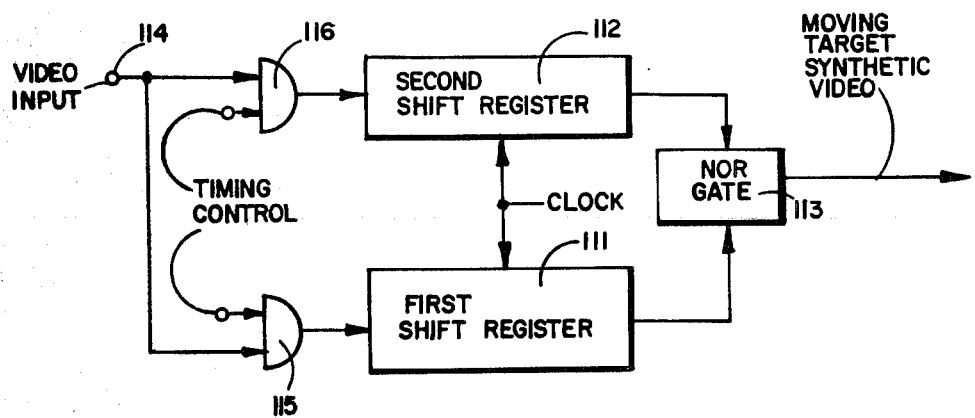
FIG. 15 is a block diagram of an alternate arrangement for velocity discrimination of moving targets.
Figure 16:
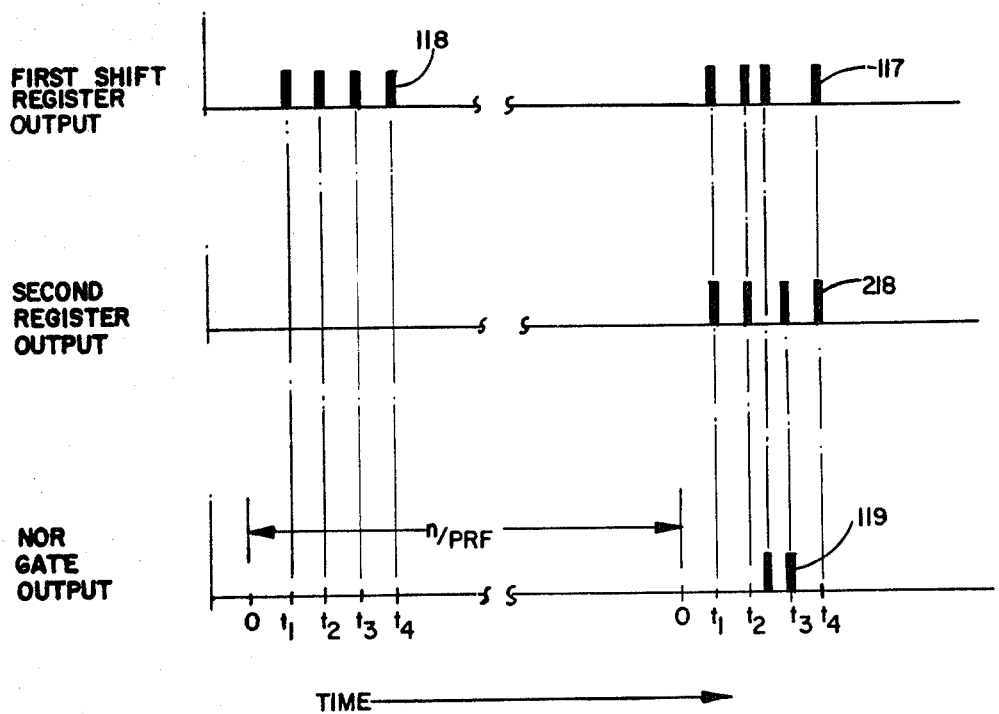
FIG. 16 is a family of representative time histories of the response of the device of FIG. 15.

A simpler means of distinguishing a target moving relative to a radar platform is shown in FIG. 15. Such arrangement includes a pair of synchronously clocked shift registers 111 and 112, the outputs of which are fed to mutually exclusive inputs of a "nor" gate 113. The inputs of registers 111 and 112 are coupled to a thresholded high-resolution video signal (on terminal 114) by gating means 115 and 116. Each of gating means 115 and 116 is responsive to a source of a timing control signal, for controlling the loading of shift registers 111 and 112. By maintaining a preselected time difference between the loading of registers 111 and 112, corresponding to that integer number ($n$), of system pulse repetition intervals, required to construct the reconstructed range trace of FIG. 3, a delayed earlier pulse train history (curve 119 of FIG. 16) may be compared with a later pulse train history (curve 117 of FIG. 16) at "NOR" gate 113. If no relative target motion has occurred during the interval between the reception of the two successive returns, the comparison of the corresponding pulses of such early and late pulse train at "NOR" gate 113 will result in no output therefrom (curve 119 at 0, $t_1$, $t_2$ and $t_4$ for the second pulse repetition interval of FIG. 16). However, if a target at, say, range time $t_3$ has moved, the resulting noncoincidence of, or difference between, corresponding portions (time $t_3$) of curves 117 and 118 will result in an output at NOR gate 113 for such range time (curve 119 at time $t_3$ in the second illustrated pulse repetition interval). Such motion (corresponding to at least one range bin, $\Delta R$) over the interval $n/PRF$, represents at least a minimum velocity, $\Delta R/\Delta t = \Delta RPRF/n$. Where a larger minimum velocity is of interest, a correspondingly lesser delay may be utilized between the time controls for gates 115 and 116 of FIG. 15. Although a single simple delay element could be employed to provide a delayed time history for comparison with a subsequent time history, the use of synchronously clocked registers provides improved signal registration at gate 113. In the case of a system mounted on a moving platform, such as an airborne radar system, means may be included for compensatorily varying the delay to detect targets moving relative to the terrain.

Figure 17:
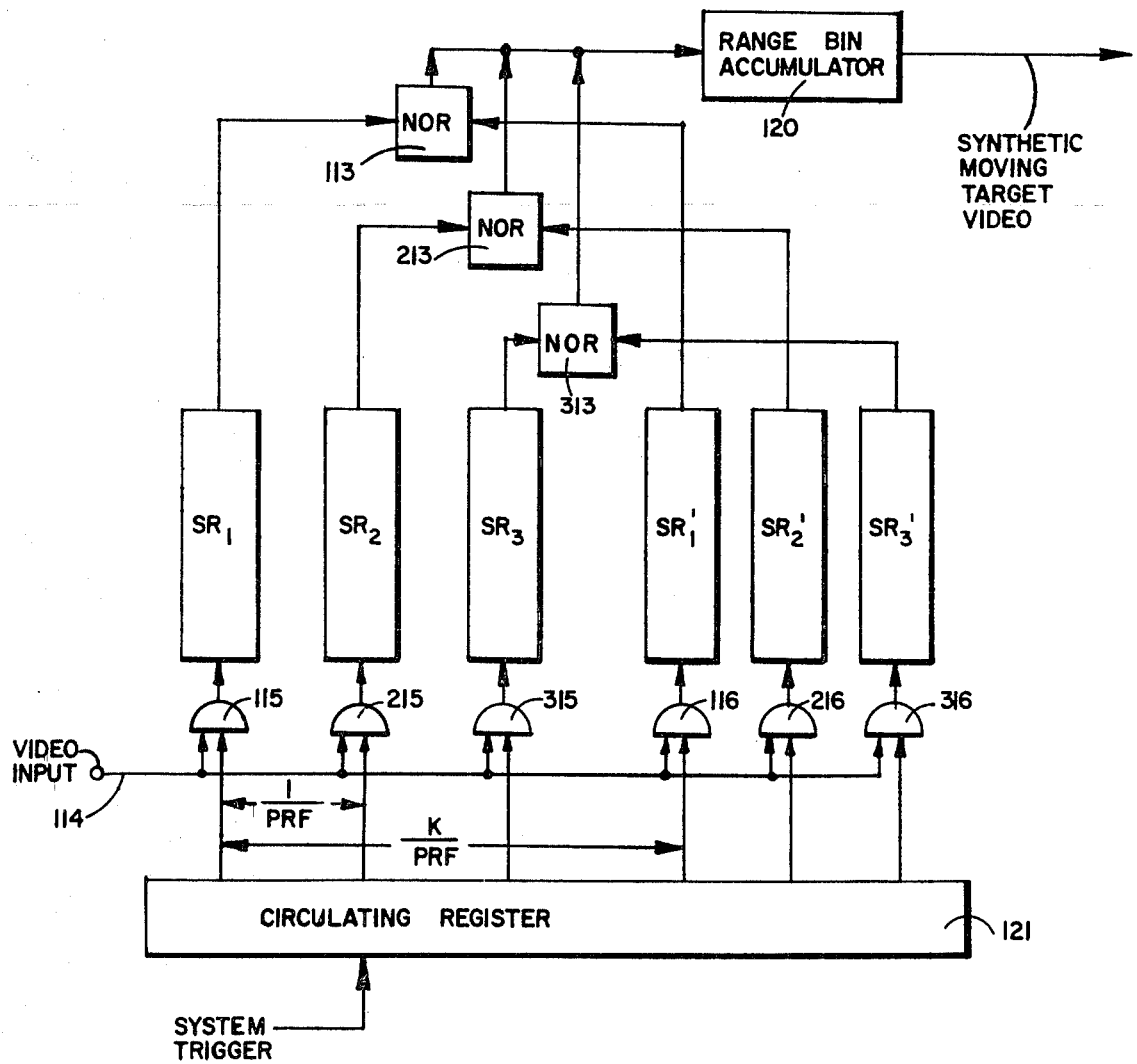
FIG. 17 is a preferred embodiment of the conceptual arrangement of FIG. 15.

An alternate arrangement, employing a plurality of shift register pairs, is shown in FIG. 17.

Referring to FIG. 17, there is illustrated a plurality of pairs of shift registers $SR_1$, $SR_1'$, $SR_2$, $SR_2'$, $SR_3$ and $SR_3'$. The outputs of each pair of registers are fed to mutually exclusive ones of an associated plurality of NOR gates, and the outputs of such NOR gates 113, 213 and 313 are fed to a range bin accumulator 120 or data storage device from which a synthetic video output is obtained. An output of each of shift registers $SR_1$, $SR_2$, $SR_3$, $SR_1'$, $SR_2'$ and $SR_3'$ is coupled to a high-resolution video input terminal 114 by means of a mutually exclusive one of gates 115, 116, 215, 216, 315 and 316. A time control input is applied to each of gates 115, 215, 315, 116, 216 and 316 by an associated output of a circulating register 121 responsive to the system trigger of the high-resolution pulsed energy system with which the data processor of FIG. 17 is intended to cooperate, the timing interval K/PRF between the shift registers of a register pair being selected from considerations of that minimum moving target velocity of interest and the timing interval between corresponding registers of successive register pairs being that integer number of pulse repetition intervals corresponding to the number of range bins or bit capacity of each register. Accumulator 120 serves as a non-coherent integrator of moving target data at each of successive portions of a range trace interval, as to provide an improved signal to noise ratio.

Accordingly, there has been described radar data processing means including a time-domain correlator for allowing narrow bandwidth processing of wideband signals in a pulse compression system, whereby the improved resolution obtainable is not sacraficed, while such narrow-bandwidth processing maintains a high signal-to-noise ratio and a high signal-to-clutter ratio. Also, the use of a time-phase adjusted local oscillator injection allows a reduction in the number of signal channels required to effect such processing, while the matching of the IF bandwidth and local oscillator injection interval obviates the necessity of correlator gating circuits for range-gated sampling purposes. Such IF bandwidth and system pulsewidth matching also assures that the compression effect or effective range resolution is more nearly related to the transmitted RF bandwidth and not affected by such system pulsewidth. Further, such radar data processor includes discrimination means for extracting information concerning qualified targets from the additional data provided by either the time domain correlator or other pulse compression data systems. Therefore, an improved data processor for a pulsed energy system has been disclosed.

Although the invention has been illustrated and described in detail, it is to be clearly understood that the same is by way of illustration and example only and is not to be taken by way of limitation, the spirit and scope of this invention being limited only by the terms of the appended claims.

I claim:

1. In a coded pulsed energy system, including an intermediate frequency receiver stage having a local oscillator input, time-domain correlation means comprising local oscillator injection means in cooperation with said intermediate frequency receiver for applying a coded periodic sampling signal at said local oscillator input of said intermediate frequency receiver stage, the sampling periodicity of which sampling signal is substantially less than the pulse repetition interval of said system and the time-phase of which sampling periodicity is discretely progressively varied each pulse repetition interval by an amount less than said sampling periodicity, and the coding of which coded sampling signal is a replica of that transmitted by said pulsed energy system; and data matrix storage means responsive to said variable time-phase sampled signals for reconstructing a range trace signal having an improved range resolution corresponding to the reciprocal of the transmitted bandwidth.

2. The system of claim 1 in which said data matrix means includes rangegated signal thresholding means and comprises range-gated time averaging means for determining and storing the average signal level of each pulse-compression range-bin of range trace signals sampled by said correlator of said system, and lower limit comparator means responsive to said range trace signals and to said average signal levels for providing a range-bin thresholded range trace signal indicative of a signal return at each range bin in excess of an average signal return at such range bin.

3. The device of claim 2 in which there is further included means responsive to said signal thresholding means for distinguishing targets having at least a minimum radial velocity relative to said system and comprising means for comparing corresponding portions of successive range trace signal histories to determine those unlike corresponding portions indicative of the range-change of a target occurring during the interval between the occurrence of said corresponding portions.

4. The device of claim 2 in which there is further provided spatial filtering means coupled to said signal thresholding means for distinguishing targets having at least a preselected minimum radial velocity relative to said system.

5. The device of claim 2 in which there is further included means for distinguishing targets having at least a preselected minimum radial velocity relative to said system and comprising first and second shift register means, each having an input responsively coupled to said signal thresholding means for providing a respective first and delayed second range trace signal histories; and nor-gate means having a first and second input respectively coupled to an output of a mutually exclusive one of said shift register means, for providing an output indicative of the non-coincident states of compared portions of said first and delayed second time histories.

6. The device of claim 2 in which said data matrix means further includes upper limit comparator means responsive to said range trace signals and having a reference input responsively coupled to a biased output of said range-gated time averaging means, and logic means responsely coupled to said upper and lower limit comparator means for providing an output indicative of a range-gated range trace signal having an amplitude within preselected upper and lower amplitude limits.

7. The device of claim 1 in which there is a further provided spatial filter means responsive to said data matrix means for indicating the detection of a target having a radial extent within preselected limits.

8. The device of claim 7 in which said spatial filter means comprises first logic means for determining the detection of a target having at least a preselected minimum radial extent;

second logic means for determining the absence of a target having a preselected maximum radial extent, and third logic means responsive to said first and second logic means for providing an output signal indicative of the detection of a target of at least said preselected minimum radial extent and less than said preselected maximum radial extent.

9. The device of claim 1 in which said data matrix means comprises two-limit amplitude comparator means for indicating a target return signal for each range-bin and having an amplitude within preselected limits.

10. The device of claim 1 in which said data matrix means comprises two-limit amplitude comparators means for indicating a target return signal from each range-bin and having an amplitude within a preselected upper amplitude limit and above a selected threshold level associated with such range-bin; and in which there is further provided two-limit spatial filtering means responsive to the output of said two-limit amplitude comparator for indicating whether said amplitude-qualified signal represents a target having a radial extent within a preselected upper and lower radial limit.

11. The device of claim 1 in which said coded pulsed energy system is of the pulse compression type and includes an intermediate frequency receiver stage having a receiver-mixer in cooperation with a stable local oscillator for providing a source of frequency $f_s$, and in which said local oscillator injection means comprises an intermediate frequency oscillator as a source of frequency $f_{IF}$;

filtered mixing means responsive to the coded spectra ($f_T$) utilized by a transmitter of said pulse compression system and further responsive to said sources of frequency $f_s$ and $f_{IF}$ for providing a local oscillator injection signal spectrum ($f_T - (f_s + f_{IF})$); and first receiver mixing means responsive to a pulse-compressed output of a receiver of said pulse compression system and having a local oscillator input responsive to said local oscillator injection signal for providing a lower sideband frequency translated output ($f_s + f_{IF}$) to an input of said receiver-mixer of said intermediate frequency receiver stage.

12. The device of claim 11 in which there is further provided radio-frequency conditioning means in cooperation with said stable local oscillator for converting received echoes of the radio frequency spectrum ($f_T$) transmitted by said pulsed energy system to a conjugate side band of the transmitted spectrum.

13. The device of claim 11 in which there is further provided switchable dispersive delay means having a transmit and receive switching modes, said delay means input-coupling a source of said coded spectrum $f_T$ to a transmitter of said pulsed energy system during said transmit-switching mode to provide frequency modulation of a pulsed transmission; and radio-frequency conditioning means in cooperation with said stable local oscillator for converting received echoes of the transmitted radio frequency spectrum ($f_T$) to a conjugate sideband of the transmitted spectrum, said delay means being interposed between an output of said radio frequency conditioning means and an input of said first receiver mixing means during said receive switching mode for providing a pulse compressed receiver input to said first receiver mixing means.

14. In a pulse-compression type pulsed energy system having a receiver, data processing means comprising two-limit amplitude comparator means responsively-coupled to said receiver for providing an output indicative of a rangegated target return signal from each of successive range bins and having an amplitude within a preselected upper amplitude limit and above a selected threshold level associated with such range bin; and two-limit spatial filtering means responsive to the output of said two limit amplitude comparator for indicating whether said amplitude-qualified signal represents a target having a radial extent within a preselected upper and lower radial limit.

15. The device of claim 14 in which said two-limit spatial filter comprises first radial extent signalling means responsive to said two-limit amplitude comparator for providing an output indicative of the presence of an amplitude-qualified target signal corresponding to at least a preselected minimum target radial extent;

second radial extent signalling means responsive to said two-limit amplitude comparator for providing an output indicative of the absence of an amplitude qualified target signal corresponding to at least a preselected maximum radial extent; and logic means responsive to said first and second radial extent signalling means for providing an output indicative of an amplitude qualified target signal representing a target having a radial extent within said two preselected radial extent limits.

16. The device of claim 14 in which said two-limit spatial filter comprises
an input terminal;
first and second coincident logic signalling means;
first tapped delay line means having an input coupled to said input terminal and further having a plurality of successive taps coupled to said first coincident logic signalling means, the interval between adjacent taps corresponding to a sampled range bin and the plurality of taps corresponding to a preselected minimum radial extent;
second tapped delay line means having an input coupled to said input terminal and further having a plurality of successive taps coupled to said second logic signalling means, the interval between adjacent taps corresponding to a sampled range bin and the plurality of taps corresponding to a preselected maximum radial extent; and
third logic means responsive to a first state of said first logic means and to a second state of said second logic means for indicating an input signal on said input terminal having a duration corresponding to a radial extent greater than said minimum radial extent and less than said maximum radial extent.

17. The device of claim 14 in which said two-limit spatial filter comprises
an input terminal;
first and second coincident logic signalling means;
tapped delay line means having an input terminal and further having a first and second plurality of successive taps respectively coupled to said first and second coincident logic signalling means, the interval between adjacent taps corresponding to a sampled range bin and the first plurality of taps corresponding to a preselected minimum radial extent,
said second plurality of successive taps including said first plurality and corresponding to a preselected maximum radial extent; and
third logic means responsive to a first state of said first logic means and to a second state of said second logic means for indicating an input signal on said input terminal having a duration corresponding to a radial extent greater than said minimum radial extent and less than said maximum radial extent.

18. In a frequency-modulation type pulse compression system, narrow bandwidth intermediate frequency correlation means for processing wide bandwidth data without compromising the data resolution limits thereof and comprising
an intermediate frequency receiver stage including a mixer having a first input responsive to received echoes of frequency-modulated pulsed energy transmitted by said system, and further having a second local oscillator input;
a periodically frequency-modulated local oscillator for providing during each system pulse repetition interval a pulse train of frequency-modulated pulses of like pulsewidth as said transmitted energy, the frequency modulation of said pulse train differing from that of said transmitted energy by an amount corresponding to a preselected intermediate frequency, said second input of said mixer being coupled to an output of said local oscillator;
periodic programmer means for cyclically, discretely, progressively adjusting the time phase of said local oscillator pulse train, relative to the occurrence of said transmitted energy, each system pulse repetition interval, said programmer having a periodicity of n system pulse repetition intervals; and
data matrix storage means responsive to said programmer and to said intermediate frequency receiver stage for providing a range trace data matrix of in range-gated data-elements corresponding to contiguous range bins.

19. In a frequency-modulation type pulse compression system, narrow bandwidth intermediate frequency correlation means for processing wideband width data without compromising the data resolution limits thereof and comprising
an intermediate frequency receiver stage including means providing a periodically frequency-modulated local oscillator input each pulse repetition interval, said local oscillator input comprising a pulse train of i frequency-modulated pulses of like pulsewidth as said transmitted energy, the frequency modulation of said pulse train differing from that of said transmitted energy by an amount corresponding to a preselected intermediate frequency,
periodic programmer means for cyclically discretely, progressively adjusting the time phase of said local oscillator pulse train, relative to the occurrence of said transmitted energy, each pulse repetition interval, said programmer having a periodicity of n pulse repetition intervals; and
data matrix storage means responsive to said programmer and to said intermediate frequency receiver stage for providing a range race data matrix of in range-gated data elements, corresponding to contiguous range bins.

20. In a pulsed energy system including a frequency-modulated transmitter and an intermediate frequency receiver stage responsive to received echoes of pulsed energy transmitted by said transmitter and having a local oscillator input, narrow bandwidth correlation means for processing wide bandwidth data without compromising the data resolution limits thereof, and comprising
local oscillator injection means cooperating with said intermediate frequency receiver stage for periodically sampling a received signal during each pulse repetition interval to provide a range-bin sampled range trace signal; and
means for adjusting the time-phase of said periodic sampling for increasing the number of range-bins sampled over a preselected data processing interval.

21. The device of claim 20 in which said intermediate frequency receiver stage includes a plurality of intermediate frequency receivers commonly responsive to said received echoes, each receiver having a separate local oscillator input; and which said local oscillator injection means comprises a like plurality of local oscillators as intermediate frequency receivers, each local oscillator cooperating with a mutually exclusive one of said receivers for sampling a mutually exclusive set of range-bins.

22. The device of claim 20 in which there is further provided data matrix storage means responsive to said intermediate frequency receiver and said means for adjusting for reconstructing a range trace signal of improved resolution from said range-bin signal samples.

23. In a frequency modulated pulsed energy system, including an intermediate frequency receiver stage having a local oscillator input, time-domain correlation means comprising local oscillator injection means in cooperation with said intermediate frequency receiver for applying a periodic sampling signal at said local oscillator input of said intermediate frequency receiver stage, the sampling periodicity of which sampling signal is an integer submultiple of the pulse repetition interval of said system and the time-phase of which sampling periodicity is discretely progressively varied each pulse repetition interval by a submultiple of said sampling periodicity; and data matrix storage means responsive to said variable time-phase sampled signals for reconstructing a range trace signal having an improved range resolution corresponding to the reciprocal of the transmitted frequency-modulation bandwidth, BW.

24. A frequency modulated pulse compression type pulsed energy system including an intermediate frequency receiver stage having a receiver-mixer in cooperation with a stable local oscillator for providing a source of frequency $f_s$, and comprising an intermediate frequency oscillator as a source of frequency $f_{IF}$;

filtered mixing means responsive to the coding spectra ($f_T$) utilized by a transmitter of said pulse compression system and further responsive to said sources of frequency $f_s$ and $f_{IF}$ for providing a local oscillator injection signal spectrum ($f_T - (f_s + f_{IF})$);

first receiver mixing means responsive to a pulse-compressed output of a receiver of said pulse compression system and having a local oscillator input responsive to said local oscillator injection signal for providing a lower sideband frequency translated output ($f_s - f_{IF}$) to an input of said receiver-mixer of said intermediate frequency receiver stage;

switchable dispersive delay means having a transmit and receive switching modes, said delay means input-coupling a source of said coding spectrum $f_T$ to a transmitter of said pulsed energy system during said transmit-switching mode to provide frequency modulation of a pulsed transmission; and radio-frequency conditioning means in cooperation with said stable local oscillator for converting received echoes of the transmitted radio frequency spectrum ($f_T$) to a conjugate sideband thereof, said delay means being interposed between an output of said radio frequency conditioning means and an input of said first receiver mixing means during said receive switching mode for providing a pulse compressed receiver input to said first receiver mixing means.

25. In a pulse compression type system providing a thresholded high-resolution signal output, means responsive to said signal output for providing a first and a delayed second range trace signal, and means responsive to said first and said delayed second range trace signal for providing a third range trace signal indicative of detected moving targets.

26. The device of claim 25 in which the output of said second mentioned means is indicative of moving targets having velocities within a selected upper and lower velocity limit.

27. In a pulsed energy system providing a thresholded receiver signal output, the combination comprising first and second shift register means, each having an input responsively coupled to said signal thresholding means for providing a respective first and delayed early second range trace signal histories; and nor gate means having a first and second input respectively coupled to an output of a mutually exclusive one of said shift register means, for providing an output indicative of the non-coincident intervals of compared portions of said first and delayed second time histories.

* * * * *